(12) United States Patent
Matsuda (10) Patent No.: US 11,438,546 B2
(45) Date of Patent: Sep. 6, 2022

(54) IMAGE CAPTURING APPARATUS AND PLAYBACK APPARATUS AND CONTROL METHODS THEREOF AND NON-TRANSITORY COMPUTER-READABLE STORAGE MEDIUM

(71) Applicant: CANON KABUSHIKI KAISHA, Tokyo (JP)

(72) Inventor: Nobuto Matsuda, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 234 days.

(21) Appl. No.: 16/807,327

(22) Filed: Mar. 3, 2020

(65) Prior Publication Data
US 2020/0288082 A1    Sep. 10, 2020

(30) Foreign Application Priority Data
Mar. 7, 2019  (JP) .............................. JP2019-042001

(51) Int. Cl.
*H04N 7/01*   (2006.01)
*H04N 9/64*   (2006.01)
*H04N 9/69*   (2006.01)

(52) U.S. Cl.
CPC .......... *H04N 7/013* (2013.01); *H04N 7/0125* (2013.01); *H04N 9/646* (2013.01); *H04N 9/69* (2013.01)

(58) Field of Classification Search
None
See application file for complete search history.

(56) References Cited

U.S. PATENT DOCUMENTS

| 2016/0100147 A1* | 4/2016 | Kim ...................... H04N 9/646 386/242 |
| 2017/0103729 A1* | 4/2017 | Huang ..................... H04N 9/68 |
| 2018/0020128 A1* | 1/2018 | Tsukagoshi ............ H04N 19/70 |
| 2018/0048845 A1* | 2/2018 | Kozuka ................. H04N 21/435 |
| 2018/0139429 A1* | 5/2018 | Park ....................... H04N 11/20 |
| 2018/0167637 A1* | 6/2018 | Yin ......................... G06T 5/007 |
| 2019/0253687 A1* | 8/2019 | Fukushima .......... G11B 27/034 |
| 2019/0268653 A1* | 8/2019 | Wakazono ............... G09G 5/02 |
| 2020/0126197 A1* | 4/2020 | Kikuchi .................. G09G 5/02 |

(Continued)

FOREIGN PATENT DOCUMENTS

JP        2016-208499 A    12/2016

*Primary Examiner* — Samira Monshi
(74) *Attorney, Agent, or Firm* — Cowan, Liebowitz & Latman, P.C.

(57) ABSTRACT

This invention provides an image capturing apparatus which comprises an image sensor configured to obtain a video signal, and at least one processor which function as a first converting unit configured to convert the video signal obtained from the image sensor into an HDR video signal; a second converting unit configured to convert the HDR video signal obtained by the first converting unit into an SDR video signal; and a controller configured to associate at least one of the HDR video signal obtained by the first converting unit and the SDR video signal obtained by second conversion means with conversion characteristic information, the conversion characteristic information representing conversion characteristics for converting the HDR video signal and the SDR video signal to one another, the controller being configured to store the associated HDR video signal or SDR video signal in a recording medium.

12 Claims, 4 Drawing Sheets

(56) References Cited

U.S. PATENT DOCUMENTS

| | | | |
|---|---|---|---|
| 2020/0143525 A1* | 5/2020 | Hu | G06T 5/009 |
| 2020/0172813 A1* | 6/2020 | Le Pendu | C10G 49/00 |
| 2020/0193573 A1* | 6/2020 | Thebault | H04N 9/68 |
| 2020/0193935 A1* | 6/2020 | Van De Kerkhof | H04N 21/434 |

* cited by examiner

FIG. 3

IMAGE CAPTURING APPARATUS AND PLAYBACK APPARATUS AND CONTROL METHODS THEREOF AND NON-TRANSITORY COMPUTER-READABLE STORAGE MEDIUM

BACKGROUND OF THE INVENTION

Field of the Invention

The present invention relates to an image capturing apparatus and a playback apparatus and control methods thereof, and a non-transitory computer-readable storage medium.

Description of the Related Art

Converting a tone of an original signal for use for another purpose has been performed. For example, as in Literature: Japanese Patent Laid-Open No. 2016-208499, there has been disclosed a method that utilizes metadata to generate a second video signal having a second luminance range narrower than a first luminance range from a video signal having the first luminance range. The use of the technique allows generating a High Dynamic Range (HDR) signal having a luminance range up to 1000 nits from an HDR signal having a luminance range up to 2000 nits. Accordingly, since the video signal with the luminance range changed according to an ability of a display device can be produced, a display according to the display can be performed.

However, the above-described conventional art considers only the conversion from the video signal having a wide luminance range into the video signal having a narrow luminance range. In actuality, a video signal having a narrow luminance range, for example, a Standard Dynamic Range (SDR) is converted into an HDR signal having a wide luminance range in some cases. For example, when a video recorded as the SDR signal having the narrow luminance range is played, inputting it to a display expecting an input of the HDR signal without change results in incorrect display. For correct display, a setting of the display needs to be changed. In particular, there has been a problem that, to play both the SDR and the HDR, changing the setting of the display each time is cumbersome.

SUMMARY OF THE INVENTION

The present invention has been made in view of such problems, and aims to provide a recording technique or a playback technique that allows playback with image quality according to characteristics of a display device regardless of whether the display device supports an SDR or an HDR.

According to an aspect of the invention, there is provided an image capturing apparatus, comprising: an image sensor configured to obtain a video signal; and at least one processor configured to function as the following units: a first converting unit configured to convert the video signal obtained from the image sensor into an HDR video signal; a second converting unit configured to convert the HDR video signal obtained by the first converting unit into an SDR video signal; and a controller configured to associate at least one of the HDR video signal obtained by the first converting unit and the SDR video signal obtained by second conversion means with conversion characteristic information, the conversion characteristic information representing conversion characteristics for converting the HDR video signal and the SDR video signal to one another, the controller being configured to store the associated HDR video signal or SDR video signal in a recording medium.

According to the present invention, even in a case where the display device supports any one of the SDR and the HDR, playback with image quality according to the characteristics of the display device is possible.

Further features of the present invention will become apparent from the following description of exemplary embodiments (with reference to the attached drawings).

DESCRIPTION OF THE EMBODIMENTS

In the following, embodiments will be described in detail, referring to the accompanying drawings. Note that the following embodiments are not intended to limit the invention according to the claims. Although embodiments describe multiple features, all of these multiple features may not be essential for the invention, and the plurality of features may be appropriately combined. Furthermore, in the accompanying drawings, identical or similar components are provided with same reference numerals, with duplicate description being omitted.

First Embodiment

Figure 1:
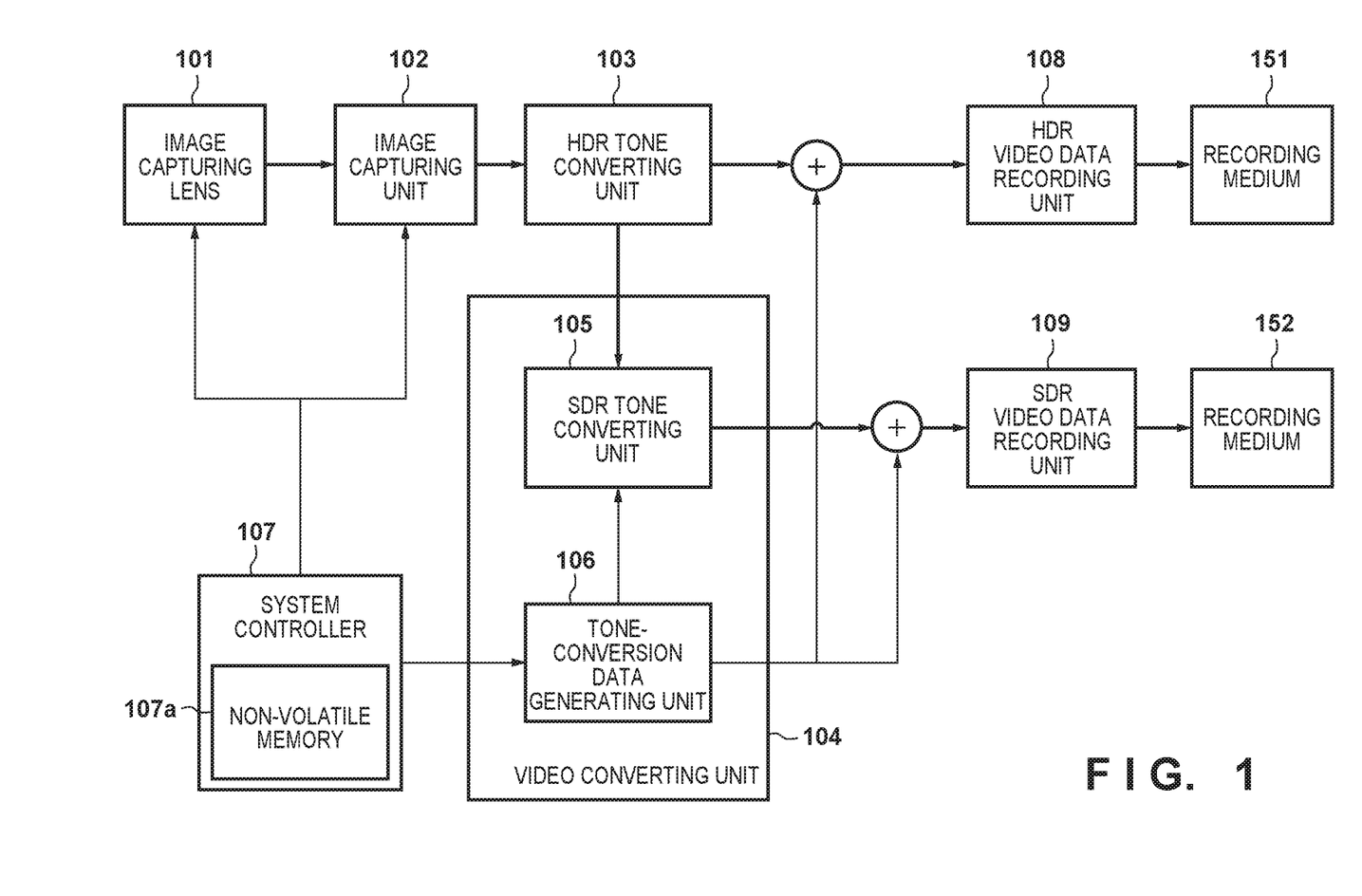
FIG. 1 is a block configuration diagram of an image capturing apparatus according to a first embodiment.

FIG. 1 is a block diagram illustrating a configuration of an image capturing apparatus of the first embodiment. A plurality of recording mediums are mountable to the image capturing apparatus of the first embodiment. An example in which the image capturing apparatus records HDR video signals in one of them and records SDR video signals in the other one will be described.

An image capturing lens 101 forms an optical image of a subject on an image capturing surface of an image capturing unit 102. The image capturing unit 102 performs photoelectric conversion on the optical image formed on the image capturing surface to generate an electrical signal. For this reason, the image capturing unit 102 includes an image sensor, such as a CMOS element or a CCD (not illustrated), and a circuit performing various controls including an A/converter, and converts the optical image into an electrical image signal (10 bits per color component) according to intensity of light. To make the image signal an appropriate one, it is necessary to control an amount of light so as to be within a range of an amount of light that can be subjected to the photoelectric conversion by the image capturing unit 102. This control is achieved by controlling the image capturing lens 101 and the image capturing unit 102 by a system controller 107. Note that the system controller 107 is configured of at least one processor and a non-volatile memory storing programs executed by the processor and various parameters.

An HDR tone converting unit 103 performs tone conversion such that the image signal obtained by the photoelectric conversion by the image capturing unit 102 has tone characteristics defined by a High Dynamic Range (HDR) and performs developing processing to generate an HDR video signal. It is assumed that each color component of the HDR video signal in the embodiment is represented by 10 bits (1024 tones).

A video converting unit 104 converts the HDR video signal generated by the HDR tone converting unit 103 into a Standard Dynamic Range (SDR) video signal where each color component is represented by eight bits (256 tones). The video converting unit 104 includes a tone-conversion data generating unit 106 that determines characteristics for tone conversion of the HDR video signal into the SDR video signal, and an SDR tone converting unit 105 that performs the tone conversion of the video signal. Note that in the present embodiment, while the SDR is assumed to be eight bits and the HDR is assumed to be 10 bits, the numbers of bits are not necessarily limited to these.

The conversion characteristics determined by the tone-conversion data generating unit 106 will be described in detail later. The conversion characteristics for converting the HDR video signals into the SDR video signals are defined. The conversion characteristics defined by the tone-conversion data generating unit 106 are transmitted to the SDR tone converting unit 105. As a result, the SDR tone converting unit 105 can convert the HDR video signal, which is the output from the HDR tone converting unit 103, into an SDR video signal having a different tone and output it.

The tone-conversion data generating unit 106 also outputs conversion characteristic information for conversion between the SDR and the HDR to be stored associated with the HDR video signal and the SDR video signal. An HDR video data recording unit 108 associates the HDR video signal, which is the output from the HDR tone converting unit 103, with the conversion characteristic information, and records and stores it in a recording medium 151. An SDR video data recording unit 109 associates the SDR video signal, which is the output from the SDR tone converting unit 105, and the conversion characteristic information, and records and stores it in a recording medium 152. In other words, the image capturing apparatus in the embodiment simultaneously records the HDR video signal and the SDR video signal in the two respective recording mediums.

Next, processing for determining the characteristics for converting the HDR video signal into the SDR video signal will be described.

Figure 2A:
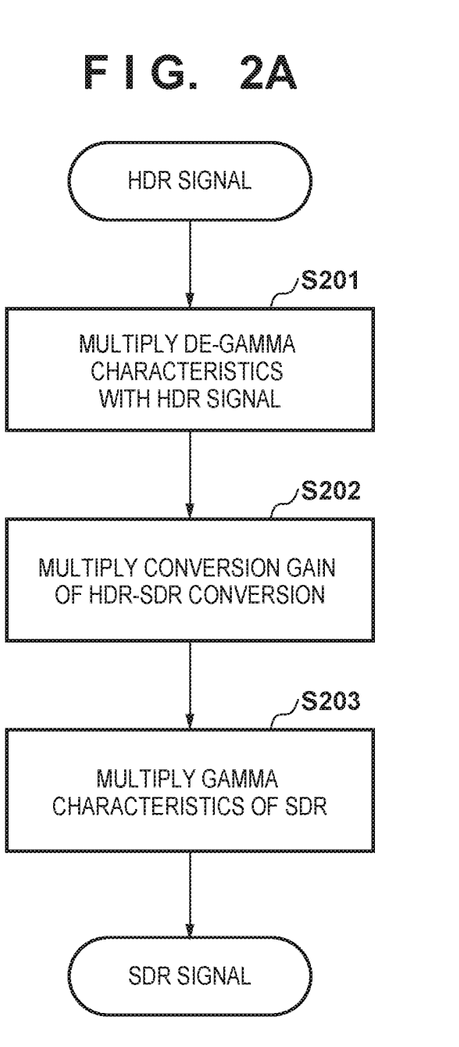
FIGS. 2A and 2B are flowcharts depicting signal conversion processing of the first embodiment.
Figure 2B:
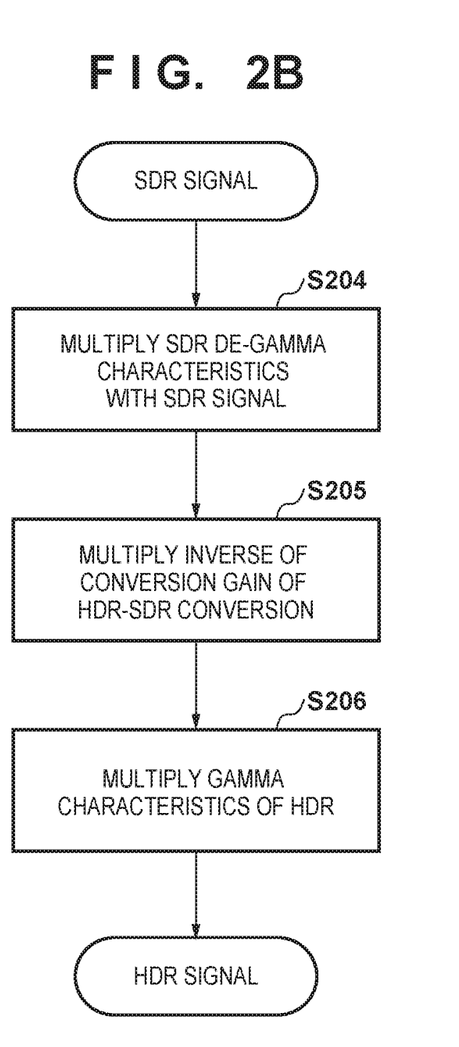

In the case where the HDR video and the SDR video are simultaneously recorded, since there is a difference in correct exposure in only conversion by a difference in gamma, both cannot be converted so as to have appropriate brightness in some cases. When the HDR and the SDR can be always converted with the same conversion gain, it is possible to deal with it as a part of the difference in gamma. However, actually, the appropriate conversion gain is usually different depending on the subject. Accordingly, flows as illustrated in FIGS. 2A and 2B are required for correct conversion.

First, characteristic determination processing for converting the HDR video signal into the SDR video signal will be described in accordance with the flowchart of FIG. 2A.

First, at S201, the video converting unit 104 performs de-gamma on an HDR gamma applied to the HDR video signal to set a state of a linear video signal. The information on de-gamma is specific to the image capturing unit 102 and is stored in advance in a non-volatile memory 107a in the system controller 107. Next, at S202, the video converting unit 104 multiplies the gain used for conversion by the linear video signal obtained by de-gamma. The gain used for conversion may be set to a fixed value as intended by a photographer, or may be calculated by any algorithm equipped in a camera. Finally, at S203, the video converting unit 104 multiplies the conversion gain, and then applies SDR gamma characteristics to be converted to obtain conversion characteristics for conversion of the HDR into the SDR video signal.

After that, in accordance with the conversion characteristics, the SDR converting unit 105 converts the HDR video signal into the SDR video signal.

As described above, in the case where the HDR video signal is converted into the SDR video signal, three pieces of conversion characteristic information, gamma characteristics of HDR, gamma characteristics of SDR, and a conversion gain, are used.

Next, processing for determining the characteristics for converting the SDR video signal into the HDR video signal will be described in accordance with the flowchart of FIG. 2B.

First, at S204, the video converting unit 104 performs de-gamma on the SDR gamma applied to the SDR video signal to return the state to the state of the linear video signal. Next, at S205, the video converting unit 104 multiplies the linear video signal by an inverse of the gain used for the conversion of the HDR into the SDR. This computation is required to return the gain-multiplied video signal to its original state when the SDR is generated from the HDR and usually changes depending on the subject as described above. Finally, at S206, the video converting unit 104 applies the gamma characteristics of the HDR to be converted to obtain the conversion characteristics for conversion of the SDR video signal into the HDR video signal.

As described above, also in converting the SDR video signal into the HDR video signal data, the three pieces of conversion characteristic information, the gamma characteristics of HDR, the gamma characteristics of SDR, and the conversion gain, are used. As long as the three pieces of the conversion characteristic information, the gamma characteristics of HDR, the gamma characteristics of SDR, and the conversion gain, are known, the HDR video signal and the SDR video signal can be converted into one another.

When the HDR video signal is recorded in the recording medium 151, an HDR video recording unit 108 associates the three pieces of conversion characteristic information, the gamma characteristics of HDR, the gamma characteristics of SDR, and the conversion gain, and stores it. For example, the HDR video recording unit 108 stores a file of the HDR video signal and a file of the conversion characteristic information with the same file name having different extensions in the recording medium 151. Note that a header of the file of the HDR video signal may include the conversion characteristic information.

On the other hand, an SDR video recording unit 109 associates the SDR video signal with the three pieces of conversion characteristic information, the gamma characteristic of HDR, the gamma characteristic of SDR, and the conversion gain, and records it in the recording medium 152. The association method may be the same as that of an HDR recording unit 108.

As a result of the above, for example, from the HDR video signal recorded in the recording medium 151, the appropriately converted SDR video signal can be generated to be output. In other words, the HDR video signal recorded in the recording medium 151 can be appropriately output to and played on a display device that supports only the SDR.

In addition, from the SDR video signal recorded in the recording medium 152, the appropriately converted HDR video signal can be generated to be output. In other words, the SDR video signal recorded in the recording medium 151 can be displayed on and output to an HDR display device at an HDR image quality.

Second Embodiment

In the first embodiment, the configuration in which the conversion characteristic information is associated with video recording has been described. In the second embodiment, a case in which the video signal recorded in the first embodiment is played by the image capturing apparatus will be described.

Figure 3:
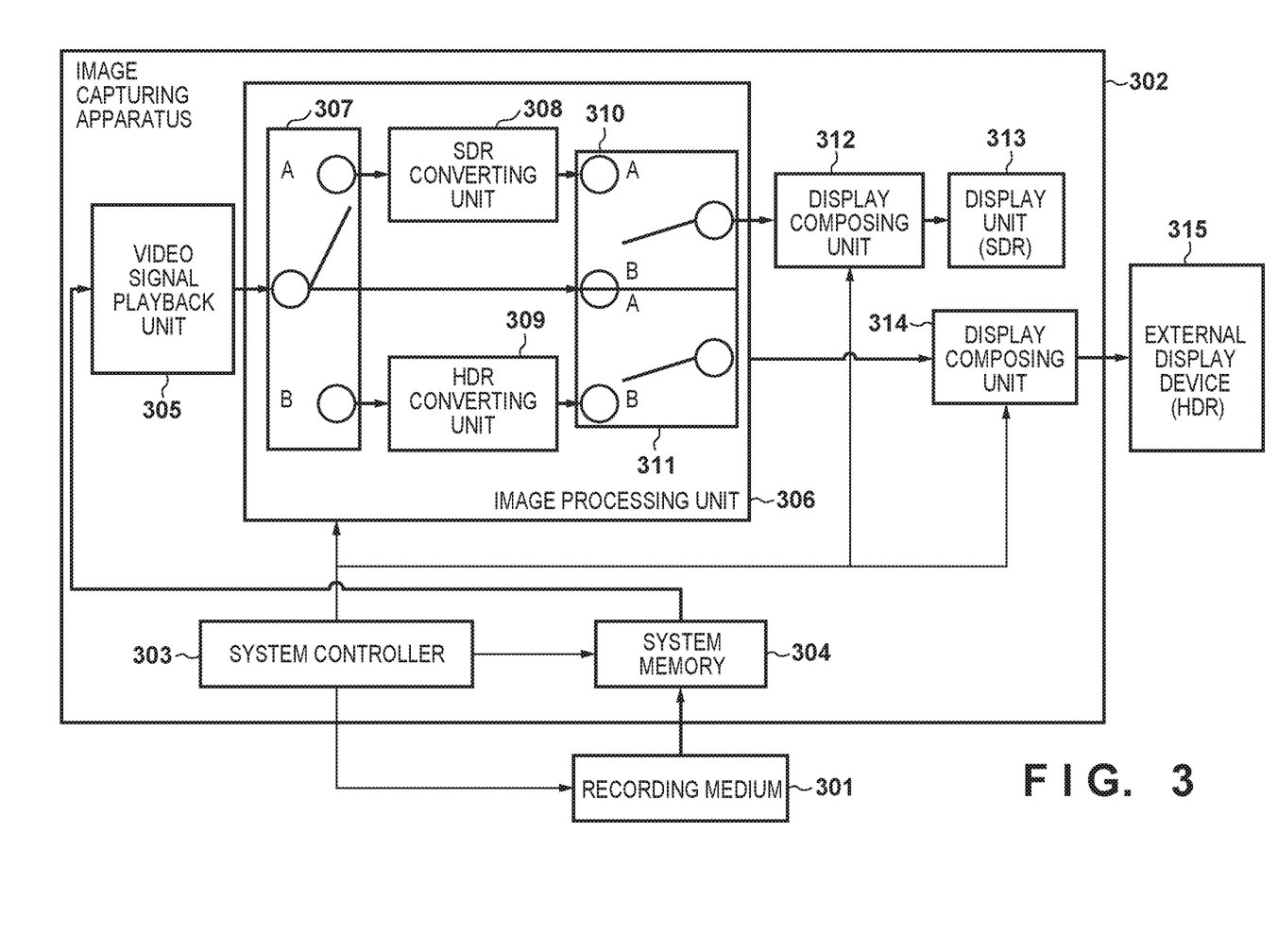
FIG. 3 is a block configuration diagram of an image capturing apparatus according to a second embodiment.

FIG. 3 is a block configuration diagram of an image capturing apparatus of the second embodiment. A system controller 303 in FIG. 3 is configured of at least one processor and a memory storing programs executed by the processor and various parameters. The image capturing apparatus of the second embodiment may be the image capturing apparatus described in the first embodiment. In this case, the system controller 303 also functions as the system controller 107 in FIG. 1. Since the playback is mainly described here, it should be noted that a configuration of, for example, an image capturing unit not directly related to the playback is omitted.

It is assumed here that a recording medium 301 has been already mounted to an image capturing apparatus 302, and data can be read from the recording medium 301. Note that the recording medium 301 will be described as being any of the recording media 151 and 152 described in the first embodiment.

A video recorded as a video file in the recording medium 301 is read as a video signal by the system controller 303 and is developed in a system memory 304. In this case, the system controller 303 analyzes a file header of the recording medium 301, determines whether the video signal developed in the system memory 304 is any of the SDR video signal or the HDR video signal, and notifies an image processing unit 306 of information indicating the determination result. Furthermore, the system controller 303 generates and sets a conversion table for an SDR converting unit 308 or an HDR converting unit 309 based on the conversion characteristic information recorded associated with the video file (details will be described later).

Next, the system controller 303 transfers contents in the system memory 304 to a video signal playback unit 305 to cause the video signal playback unit 305 to perform playback processing, and creates the video signal. The video signal is image-processed by the image processing unit 306 and output as the SDR video signal. After, for example, an OSD is composed by a display composing unit 312, it is displayed in a display unit (SDR display device) 313 included in the image capturing apparatus. Simultaneously, the HDR video signal is output from the image processing unit 306. After, for example, the OSD is composed by a display composing unit 314, it is output to an external display device (HDR display device) 315 via an interface (not illustrated), and the external display device 315 is caused to display it.

Next, image processing performed by the image processing unit 306 in the embodiment will be described. A path of the video signal input to the image processing unit 306 is switched by three video switching units, a video switching unit 307, a video switching unit 310, and a video switching unit 311. The first path leads to the SDR converting unit 308 that converts the HDR video signal into the SDR video signal, and the second path leads to the HDR converting unit 309 that converts the SDR video signal into the HDR video signal.

From the information indicating the determination result from the system controller 303, the image processing unit 306 can determine whether the video signal input from the system memory 304 is the HDR video signal or the SDR video signal.

First, a case in which the video signal input from the system memory 304 is the HDR video signal will be described.

In a case where the video signal input from the system memory 304 is the HDR video signal, the image processing unit 306 controls the video switching unit 307 to cause the video switching unit 307 to select a terminal A and transmits the video signal to the SDR converting unit 308. The conversion from the HDR video signal into the SDR video signal performed by the SDR converting unit 308 will be described later. The image processing unit 306 controls the video switching unit 310 to cause the video switching unit 310 to select a terminal A. As a result, the SDR video signal output from the SDR converting unit 308 is output to the display unit 313 via the display composing unit 312 through the terminal A side of the video switching unit 310 to be displayed. Additionally, the image processing unit 306 controls a video switching unit 311 to cause the video switching unit 311 to select a terminal A. As a result, the HDR signal input from the system memory 304 is output to the external display device 315 via the display composing unit 314 through the video switching unit 307 and through the terminal A side of the video switching unit 311 to be displayed.

Next, a case in which the video signal input from the system memory 304 is the SDR video signal will be described.

In this case, the image processing unit 306 controls the video switching unit 310 to cause the video switching unit 310 to select a B terminal, and transmits the video signal to the HDR converting unit 309. The HDR converting unit 309 converts the input SDR video signal into the HDR video signal. The conversion from the SDR video signal into the HDR video signal performed by the HDR converting unit 309 will be described later. The image processing unit 306 controls the video switching unit 310 to cause the video switching unit 310 to select the B terminal, and controls the video switching unit 311 to cause the video switching unit 311 to select a B terminal. As a result, the image processing unit 306 causes the SDR video signal input from the system memory 304 to be supplied to the display unit 313 via the video switching unit 310 and the display composing unit 312, and the SDR video signal is displayed as an SDR video. On the other hand, the HDR video signal obtained from the HDR converting unit 309 is output to the external display device 315 via the video switching unit 311 and the display composing unit 314, and a video with an HDR image quality is displayed.

Figure 4A:
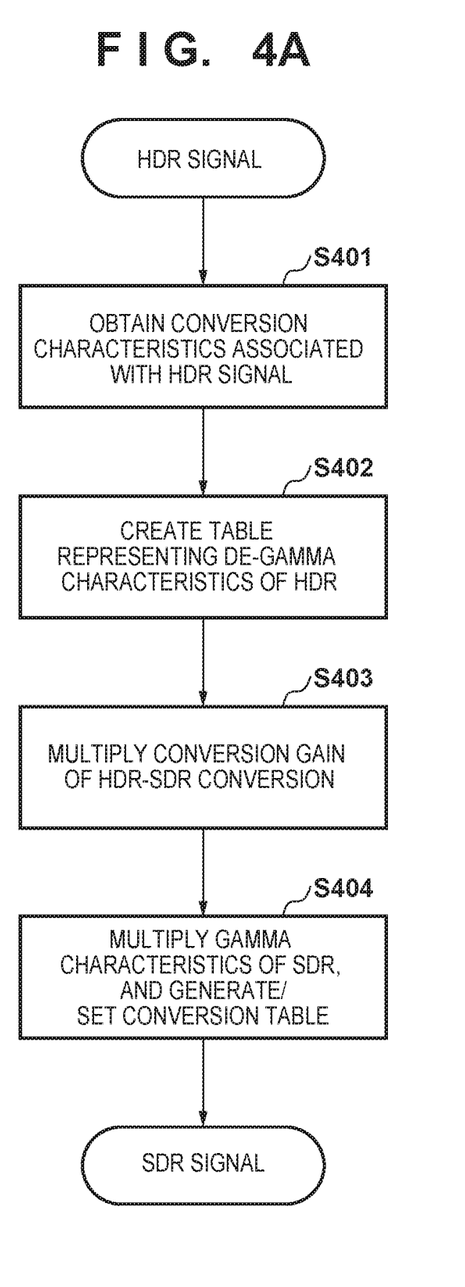
FIGS. 4A and 4B are flowcharts depicting signal conversion processing of the second embodiment.
Figure 4B:
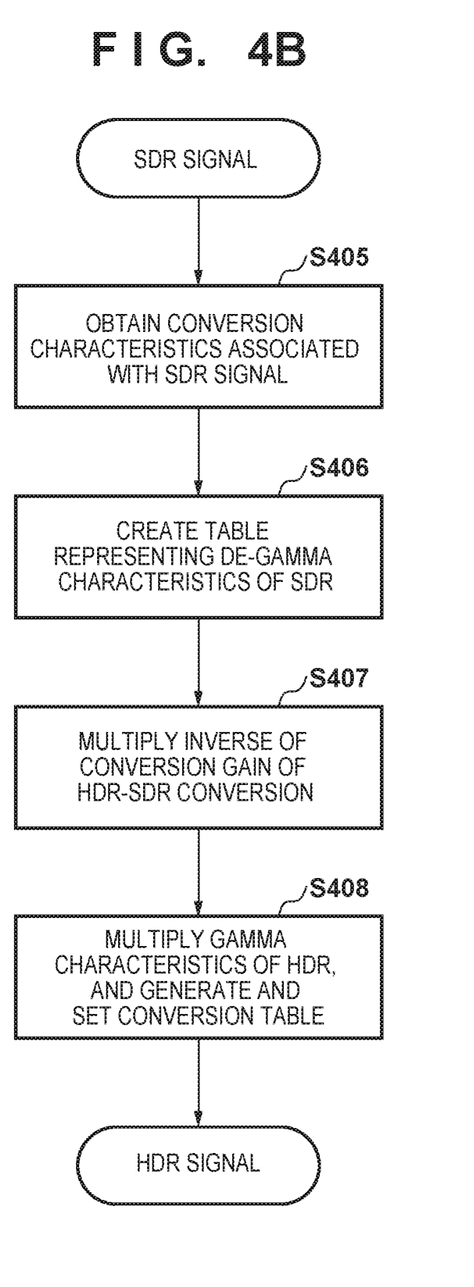

FIGS. 4A and 4B are flowcharts depicting processing of the system controller 303 regarding the conversion between the HDR video signal and the SDR video signal. The processing depicted in this flowchart is performed before video playback processing.

First, the processing of the system controller 303 regarding the conversion of the HDR video signal into the SDR video signal will be described with reference to the flowchart of FIG. 4A.

At S401, the system controller 303 reads the conversion characteristic information associated with the HDR video signal. At S402, the system controller 303 performs inverse conversion of the gamma characteristics of the HDR signal included in the conversion characteristic information obtained at S401 to create a table representing a de-gamma curve for returning the video signal to a linear video signal. Next, at S403, the system controller 303 modifies the table created at S402 according to an HDR-SDR conversion gain included in the conversion characteristic information obtained at S401. Finally, at S404, a stem controller 303 applies gamma characteristics of the SDR signal included in the conversion characteristic information obtained at S401 to the table, completes an HDR-SDR conversion table (10-bit input, eight-bit output table for each color component) by an amount for conversion of the HDR video signal into the SDR video signal, and sets it to the SDR converting unit 308 in the image processing unit 306.

Next, the processing of the system controller 303 regarding the conversion of the SDR video signal into the HDR video signal will be described with reference to the flowchart of FIG. 4B.

At S405, the system controller 303 reads the conversion characteristic information associated with the SDR video signal. At S406, the system controller 303 performs inverse conversion of the gamma characteristics of the SDR signal included in the conversion characteristic information obtained at S405 to create a table representing a de-gamma curve for returning the video signal to a linear video signal. Next, at S407, the system controller 303 modifies the table created at S406 according to an SDR-HDR conversion gain included in the conversion characteristic information obtained at S405. Finally, at S408, the system controller 303 applies gamma characteristics of the HDR signal included in the conversion characteristic information obtained at S405 to the table, completes an SDR-HDR conversion table (eight-bit input, 10-bit output table for each color component) for conversion of the SDR video signal into the HDR video signal, and sets it to the HDR converting unit 309 in the image processing unit 306.

Performing the mutual conversion between the HDR video signal and the SDR video signal by the methods described above sacrifices some performances. For example, performing gamma conversion, de-gamma conversion, gain multiplication, and inverse gain multiplication by finite digital processing generates a conversion error. In addition, information on high luminance subject that the HDR signal holds is clipped and rounded in the SDR signal. Therefore, it is necessary to inform a user whether the signal output to the display unit 313 or the external display device 315 is the original video signal or the video signal output through the conversion.

In the present embodiment, the display composing unit 312 and the display composing unit 314 are means to serve the role. For example, when the SDR video signal is output through conversion from the HDR video signal, the system controller 303 controls the display composing unit 312 to cause the display composing unit 312 to compose an icon indicating that the conversion of the HDR→the SDR has been performed with the SDR video signal and causes the display unit 313 to display the composite video signal.

Conversely, in a case of outputting the HDR video signal through conversion from the SDR video signal, the system controller 303 controls the display composing unit 314 to cause the display composing unit 314 to compose a predetermined icon with which the conversion of the SDR→the HD has been performed is identifiable with the HDR video signal and causes the external display device 315 to display the composite video signal.

The fact that the video signal has been converted is conveyed to the user by composing the icon has been described as the example. However, displaying the icon probably causes a difficulty in seeing a photographed subject. Therefore, a method for composing a specific hue and a frame of luminance with a frame portion surrounding a video is also conceivable. This can also be achieved using the display composing unit 312 and the display composing unit 314.

In the second embodiment, while the example of using the conversion table for conversion of the SDR video signal into the HDR video signal has been described, the conversion may be performed by computation based on a predetermined algorithm. For example, in a case where the conversion characteristics are differentiated according to characteristics of the subject and photographing conditions, conversion using computation using, for example, the characteristics of the subject and the photographing conditions as parameters is more appropriate than conversion using LUT. Additionally, while the example of the application to the image capturing apparatus has been described in the second embodiment, it is only necessary that an apparatus, such as a PC, can read the recording medium recording the video signal and functions as a playback apparatus including a display device and is not limited to the image capturing apparatus. In this case, the playback apparatus may determine whether the video signal recorded in the recording medium is any of the SDR video signal or the HDR video signal, and may perform the display control according to whether the connected display device is an SDR display device or an HDR display device.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-042001, filed Mar. 7, 2019, which is hereby incorporated by reference herein in its entirety.

What is claimed is:

1. An image capturing apparatus, comprising:
an image sensor configured to obtain a video signal; and
at least one processor configured to function as the following units:
a first converting unit configured to convert the video signal obtained from the image sensor into an HDR video signal;
a second converting unit configured to convert the HDR video signal obtained by the first converting unit into an SDR video signal; and
a controller configured to associate at least one of the HDR video signal obtained by the first converting unit and the SDR video signal obtained by second conversion unit with conversion characteristic information, the conversion characteristic information representing conversion characteristics for converting the HDR video signal and the SDR video signal to one another, the controller being configured to store the associated HDR video signal or SDR video signal in a recording medium.

2. The apparatus according to claim 1, wherein
a plurality of the recording media are mountable to the mage capturing apparatus,
wherein the controller is configured to:
associate the HDR video signal with the conversion characteristic information and record the associated HDR video signal in a first recording medium among the plurality of recording media; and
associate the SDR video signal with the conversion characteristic information and record the associated SDR video signal in a second recording medium among the plurality of recording media.

3. The apparatus according to claim 1, wherein
the conversion characteristic information includes information representing a gamma conversion for conversion of the video signal obtained by the image sensor into the HDR video signal, information indicating a gain, and information representing a gamma conversion for obtaining an SDR video.

4. A playback apparatus that plays a video signal recorded in a recording medium, the playback apparatus, comprising:
at least one processor configured to function as the following units:
a connecting unit configured to connect the recording medium that has recorded a video by the image capturing apparatus according to claim 1;
a determination unit configured to determine whether a video signal recorded in the recording medium connected to the connection unit is an SDR video signal or an HDR video signal;
a generation unit configured such that:
when a result of the determination by the determination unit indicates the SDR video signal, the generation unit generates a first conversion table from conversion characteristic information recorded associated with the SDR video signal, the first conversion table being for conversion of the SDR video signal into the HDR video signal; and
when the result of the determination by the determination unit indicates the HDR video signal, the generation unit generates a second conversion table from conversion characteristic information recorded associated with the HDR video signal, the second conversion table being for conversion of the HDR video signal into the SDR video signal; and
a display controller configured to output the video signal recorded in the recording medium, the video signal obtained by the conversion with the first conversion table, and the video signal obtained by the conversion with the second conversion table to a display device according to the result of the determination by the determination unit,
wherein the display controller is configured such that:
when the video signal recorded in the recording medium is the SDR video signal and the display device is an SDR display device, or when the video signal recorded in the recording medium is the HDR video signal and the display device is an HDR display device, the display controller outputs the video signal recorded in the recording medium to the display device;
when the video signal recorded in the recording medium is the SDR video signal and the display device is the HDR display device, the display controller outputs the video signal obtained by the conversion of the video signal recorded in the recording medium with the first conversion table to the display device; and
when the video signal recorded in the recording medium is the HDR video signal and the display device is the SDR display device, the display controller outputs the video signal obtained by the conversion of the video signal recorded in the recording medium with the second conversion table to the display device.

5. The apparatus according to claim 4, wherein
the playback apparatus includes an interface configured to connect the SDR display device and the HDR display device,
wherein the display controller is configured such that:
when the SDR video signal is recorded in the recording medium, the display controller outputs the SDR video signal recorded in the recording medium to the SDR display device and outputs the HDR video signal obtained by the conversion with the first conversion table via the interface; and
when the HDR video signal is recorded in the recording medium, the display controller outputs the HDR video signal recorded in the recording medium via the interface and outputs the SDR video signal obtained by the conversion with the second conversion table to the SDR display device.

6. The apparatus according to claim 4, wherein
the display controller includes a composing unit, the composing unit being configured to compose the video signal obtained by the conversion with the first conversion table or the second conversion table with a predetermined image, the performed conversion being identifiable with the predetermined image.

7. The apparatus according to claim 6, wherein
the composing unit is configured to compose an icon indicating that the conversion has been performed as the predetermined image with the video signal obtained by the conversion with the first conversion table or the second conversion table.

8. The apparatus according to claim 6, wherein
the composing unit is configured to compose an image indicating a frame of a video indicating that the conversion has been performed as the predetermined image with the video signal obtained by the conversion with the first conversion table or the second conversion table.

9. A method for controlling an image capturing apparatus, the method comprising:
(a) converting the video signal obtained from an image sensor into an HDR video signal;
(b) converting the HDR video signal obtained in the converting (a) into an SDR video signal; and
(c) associating at least one of the HDR video signal obtained in the converting (a) and the SDR video signal obtained in the converting (b) with conversion characteristic information, the conversion characteristic information representing conversion characteristics for converting the HDR video signal and the SDR video signal to one another, and storing the associated HDR video signal or SDR video signal in a recording medium.

10. A method for controlling a playback apparatus that comprises a connecting unit configured to connect the recording medium that has recorded a video by the image capturing apparatus according to claim 1 and plays a video signal recorded in the recording medium, the method comprising:
(a) determining whether a video signal recorded in the recording medium connected to the connection unit is an SDR video signal or an HDR video signal;
(b) when a result of the determination by the determination unit indicates the SDR video signal, generating a first conversion table from conversion characteristic information recorded associated with the SDR video signal, the first conversion table being for conversion of the SDR video signal into the HDR video signal;
(c) when the result of the determination indicates the HDR video signal, generating a second conversion table from conversion characteristic information recorded associated with the HDR video signal, the second conversion table being for conversion of the HDR video signal into the SDR video signal; and
(d) outputting the video signal recorded in the recording medium, the video signal obtained by the conversion with the first conversion table, and the video signal obtained by the conversion with the second conversion table to a display device according to the result of the determination,
wherein in the outputting (d),
when the video signal recorded in the recording medium is the SDR video signal and the display device is an SDR display device, or when the video signal recorded in the recording medium is the HDR video signal and the display device is an HDR display device, outputting the video signal recorded in the recording medium to the display device;
when the video signal recorded in the recording medium is the SDR video signal and the display device is the HDR display device, outputting the video signal obtained by the conversion of the video signal recorded in the recording medium with the first conversion table to the display device; and
when the video signal recorded in the recording medium is the HDR video signal and the display device is the SDR display device, outputting the video signal obtained by the conversion of the video signal recorded in the recording medium with the second conversion table to the display device.

11. A non-transitory computer-readable storage medium storing a program which, when read and executed by a computer, causes an image capturing apparatus to execute the step of a method comprising:
(a) converting the video signal obtained from an image sensor into an HDR video signal;
(b) converting the HDR video signal obtained in the converting (a) into an SDR video signal; and
(c) associating at least one of the HDR video signal obtained in the converting (a) and the SDR video signal obtained in the converting (b) with conversion characteristic information, the conversion characteristic information representing conversion characteristics for converting the HDR video signal and the SDR video signal to one another, and storing the associated HDR video signal or SDR video signal in a recording medium.

12. A non-transitory computer-readable storage medium storing a program which, when read and executed by a computer, causes a playback apparatus to execute the steps of a method, wherein the playback apparatus comprising a connecting unit configured to connect the recording medium that has recorded a video by the image capturing apparatus according to claim 1, the method comprising:
(a) determining whether a video signal recorded in the recording medium connected to the connection unit is an SDR video signal or an HDR video signal;
(b) when a result of the determination by the determination unit indicates the SDR video signal, generating a first conversion table from conversion characteristic information recorded associated with the SDR video signal, the first conversion table being for conversion of the SDR video signal into the HDR video signal;
(c) when the result of the determination indicates the HDR video signal, generating a second conversion table from conversion characteristic information recorded associated with the HDR video signal, the second conversion table being for conversion of the HDR video signal into the SDR video signal; and
(d) outputting the video signal recorded in the recording medium, the video signal obtained by the conversion with the first conversion table, and the video signal obtained by the conversion with the second conversion table to a display device according to the result of the determination,
wherein in the outputting (d),
when the video signal recorded in the recording medium is the SDR video signal and the display device is an SDR display device, or when the video signal recorded in the recording medium is the HDR video signal and the display device is an HDR display device, outputting the video signal recorded in the recording medium to the display device;
when the video signal recorded in the recording medium is the SDR video signal and the display device is the HDR display device, outputting the video signal obtained by the conversion of the video signal recorded in the recording medium with the first conversion table to the display device; and
when the video signal recorded in the recording medium is the HDR video signal and the display device is the SDR display device, outputting the video signal obtained by the conversion of the video signal recorded in the recording medium with the second conversion table to the display device.

* * * * *